US012748364B2

(12) United States Patent
Sasaki et al.

(10) Patent No.: US 12,748,364 B2
(45) Date of Patent: Sep. 29, 2026

(54) IMAGE FORMING APPARATUS INCLUDING TONER CONVEYANCE DETECTION PORTION DETECTING TONER CONVEYANCE ERROR IN TONER CONVEYANCE

(71) Applicant: KYOCERA Document Solutions Inc., Osaka (JP)

(72) Inventors: Asami Sasaki, Osaka (JP); Minoru Wada, Osaka (JP); Hiroshi Yamazaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/047,140

(22) Filed: Feb. 6, 2025

(65) Prior Publication Data

US 2025/0264825 A1 Aug. 21, 2025

(30) Foreign Application Priority Data

Feb. 15, 2024 (JP) ................................ 2024-021014

(51) Int. Cl.
*G03G 15/08* (2006.01)

(52) U.S. Cl.
CPC ..... *G03G 15/0879* (2013.01); *G03G 15/0862* (2013.01); *G03G 15/0867* (2013.01); *G03G 2215/0678* (2013.01); *G03G 2215/0891* (2013.01)

(58) Field of Classification Search
CPC ........... G03G 15/0862; G03G 15/0865; G03G 15/0867; G03G 15/0879; G03G 15/556
See application file for complete search history.

(56) References Cited

U.S. PATENT DOCUMENTS

| | | | | |
|---|---|---|---|---|
| 10,527,996 | B2 * | 1/2020 | Soda | G03G 15/0893 |
| 11,112,726 | B2 | 9/2021 | Soda | G03G 15/0868 |
| 2019/0187603 | A1 | 6/2019 | Soda | G03G 15/556 |
| 2021/0223716 | A1 | 7/2021 | Soda | G03G 15/0868 |

FOREIGN PATENT DOCUMENTS

JP 2014-157350 A 8/2014

OTHER PUBLICATIONS

Extended European Search Report dated May 22, 2025, issued by the European Patent Office in corresponding application EP 25157721.9.

* cited by examiner

*Primary Examiner* — Hoang X Ngo
(74) *Attorney, Agent, or Firm* — Stein IP, LLC

(57) ABSTRACT

An image forming apparatus includes a developing device, a container, a toner replenishment device, a toner conveyance detection portion, and a control portion. The toner replenishment device includes a plurality of toner replenishment paths through which toner in the container is conveyed and replenished to the developing device. The toner conveyance detection portion detects a toner conveyance error in toner conveyance performed by using the plurality of toner replenishment paths. In a case where the toner conveyance detection portion has detected a toner conveyance error in one of the toner replenishment paths that is in use, the control portion switches to another one of the toner replenishment paths to convey the toner.

5 Claims, 8 Drawing Sheets

IMAGE FORMING APPARATUS INCLUDING TONER CONVEYANCE DETECTION PORTION DETECTING TONER CONVEYANCE ERROR IN TONER CONVEYANCE

INCORPORATION BY REFERENCE

This application is based on and claims the benefit of priority from Japanese Patent Application No. 2024-021014 filed on Feb. 15, 2024, the contents of which are hereby incorporated by reference.

BACKGROUND

The present disclosure relates to an image forming apparatus.

In electrophotographic image forming apparatuses, such as copiers and printers, developing devices are widely used to develop an electrostatic latent image with toner on the outer circumferential surface of a photosensitive drum, thereby forming a toner image which is later transferred onto a sheet. In these apparatuses, the developing device is replenished with toner from a container that is attachable to and detachable from the main body of the image forming apparatus.

SUMMARY

According to one aspect of the present disclosure, an image forming apparatus includes a developing device, a container, a toner replenishment device, a toner conveyance detection portion, and a control portion. The developing device supplies toner to an image carrier. The container contains the toner to be replenished to the developing device. The toner replenishment device includes a plurality of toner replenishment paths through which the toner in the container is conveyed and replenished to the developing device. The toner conveyance detection portion detects a toner conveyance error in toner conveyance performed by using the plurality of toner replenishment paths. The control portion controls operations of the developing device and the toner replenishment device. In a case where the toner conveyance detection portion has detected the toner conveyance error in one of the toner replenishment paths that is in use, the control portion switches to another one of the toner replenishment paths to convey the toner.

DETAILED DESCRIPTION

Hereinafter, an embodiment of the present disclosure will be described with reference to the accompanying drawings. It should be understood that the present disclosure is not limited to the following descriptions.

Figure 1:
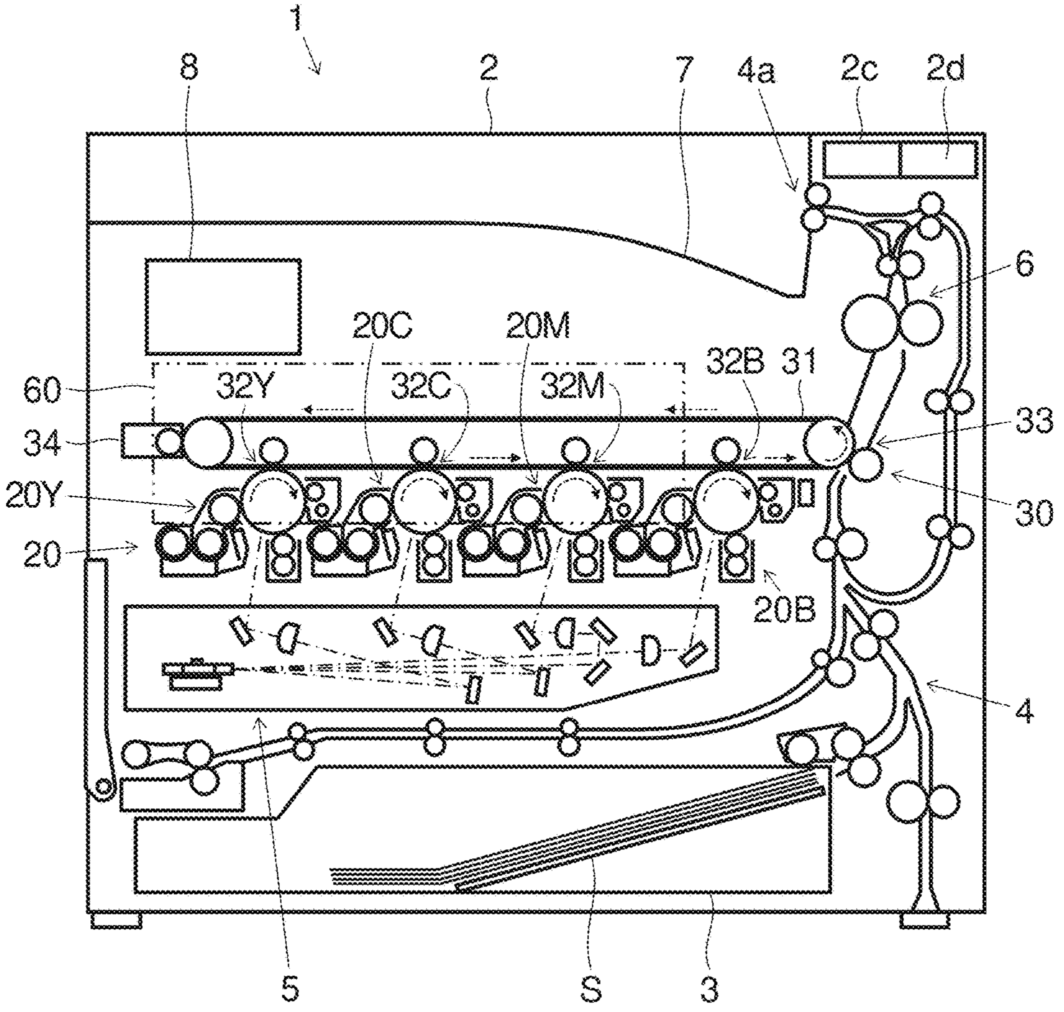
FIG. 1 is a schematic sectional view of an image forming apparatus according to one embodiment of the present disclosure.
Figure 2:
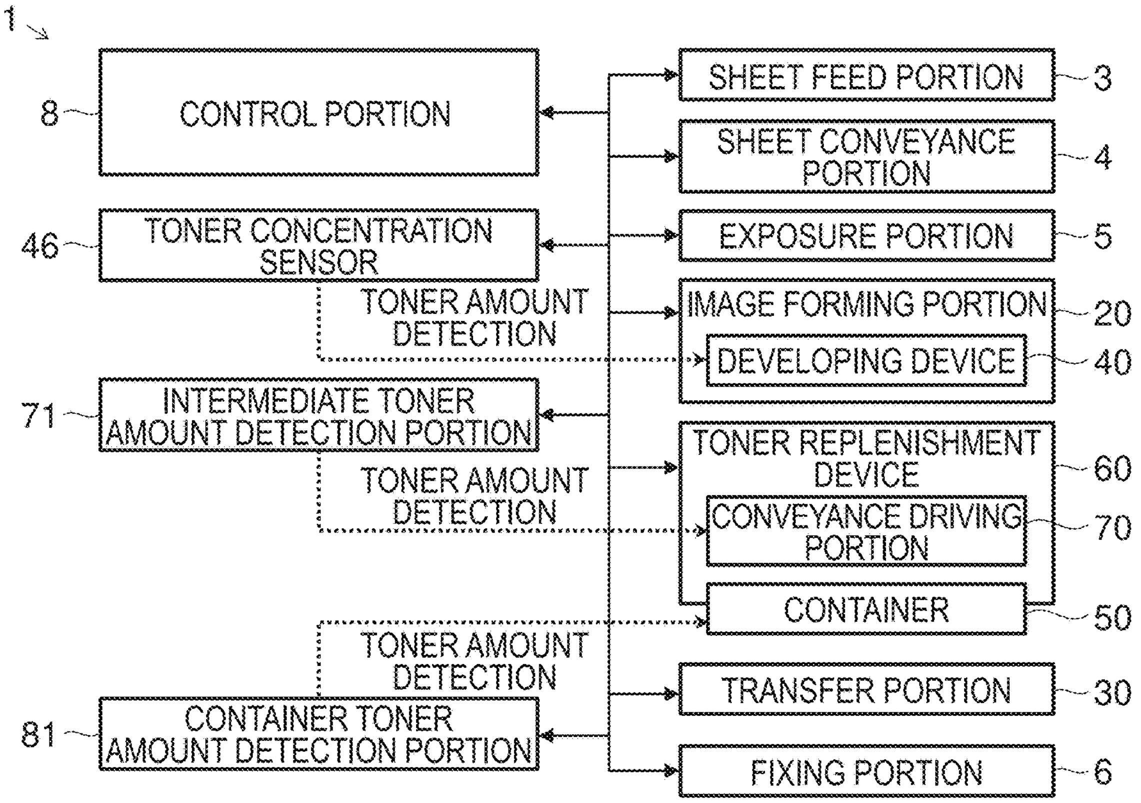
FIG. 2 is a block diagram schematically showing a configuration of the image forming apparatus shown FIG. 1.
Figure 3:
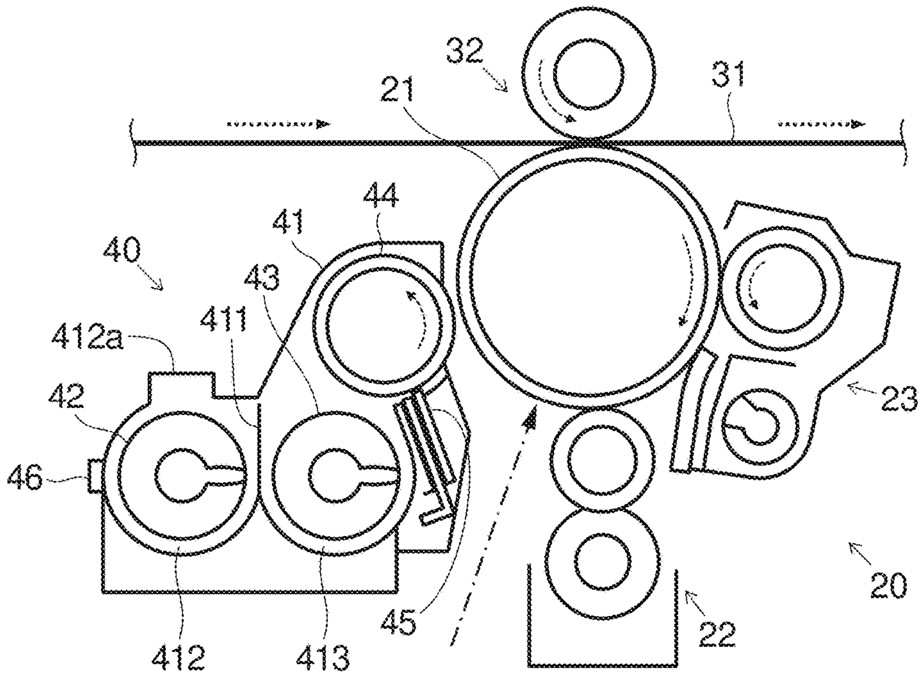
FIG. 3 is a sectional view of and around an image forming portion of the image forming apparatus shown in FIG. 1.

FIG. 1 is a schematic sectional view of an image forming apparatus 1 according to an embodiment. FIG. 2 is a block diagram schematically showing a configuration of the image forming apparatus 1 shown in FIG. 1. FIG. 3 is a sectional view of and around an image forming portion 20 of the image forming apparatus 1 shown in FIG. 1. The image forming apparatus 1 of the present embodiment is, for example, a tandem-type color printer that uses an intermediate transfer belt 31 to transfer a toner image onto a sheet S. The image forming apparatus 1 may be what is called a multifunction peripheral having functions including, for example, printing, scanning (image reading), facsimile transmission, etc.

As shown in FIG. 1, FIG. 2, and FIG. 3, the image forming apparatus 1 includes, arranged in a main body 2 thereof, a sheet feed portion 3, a sheet conveyance portion 4, an exposure portion 5, the image forming portion 20, a transfer portion 30, a fixing portion 6, a sheet discharge portion 7, and a control portion 8.

The main body 2 includes an operation panel 2*c*. The operation panel 2*c* is disposed in an upper front part of the main body 2, for example, and includes a display portion 2*d*, which is a liquid crystal display or the like. The operation panel 2*c* displays, on the display portion 2*d*, screen images related to inputs of settings such as printing conditions including the type and size of a sheet S to be used for printing, execution instructions, and the like, and accepts those inputs directly from a user. Furthermore, the display portion 2*d* also serves as a notification portion that displays, for example, statuses of the image forming apparatus 1, cautions, error massages, and the like, to thereby provide the use with those pieces of information.

The sheet feed portion 3 is disposed in a bottom part of the main body 2. The sheet feed portion 3 accommodates a plurality of sheets S for printing and sends out the sheets S separately one by one during printing. The sheet conveyance portion 4 extends in an up-down direction along a side wall of the main body 2. The sheet conveyance portion 4 conveys a sheet S sent out from the sheet feed portion 3 to a secondary transfer portion 33 and the fixing portion 6, and further discharges the sheet S, after fixing, through a sheet discharge port 4*a* into the sheet discharge portion 7. The exposure portion 5 is disposed above the sheet feed portion 3. The exposure portion 5 emits laser light, which is controlled based on image data, toward the image forming portion 20 to irradiate it with the laser light.

The image forming portion 20 is disposed above the exposure portion 5 but below the intermediate transfer belt 31. The image forming portion 20 includes an image forming portion 20Y for yellow, an image forming portion 20C for cyan, an image forming portion 20M for magenta, and an image forming portion 20B for black. These four image forming portions 20 are identical in basic configuration. Thus, in the following description, unless specific distinction is necessary, color identification symbols "Y," "C," "M," and "B" may be omitted.

The image forming portions 20 each include a photosensitive drum (image carrier) 21 that is supported so as to be rotatable in a predetermined direction (clockwise in FIG. 1 and FIG. 3). The image forming portions 20 each further include, around the photosensitive drum 21, a charging portion 22, a developing device 40, and a drum cleaning portion 23, which are arranged along a rotation direction of the photosensitive drum 21. Note that, between the developing device 40 and the drum cleaning portion 23, a primary transfer portion 32 is disposed.

The photosensitive drum 21 is formed in a horizontally extending cylindrical shape and has a photosensitive layer on an outer circumferential surface thereof. The charging portion 22 charges a surface (the outer circumferential surface) of the photosensitive drum 21 to a predetermined potential. The exposure portion 5 exposes the outer circumferential surface of the photosensitive drum 21 with light after the outer circumferential surface is charged by the charging portion 22, and thereby, an electrostatic latent image of an original image is formed on the outer circumferential surface of the photosensitive drum 21. The developing device 40 supplies toner onto the electrostatic latent image to develop it, and thereby a toner image is formed. The four image forming portions 20 each form a toner image in a corresponding one of the different colors. After the toner image is primarily transferred onto an outer circumferential surface of the intermediate transfer belt 31, the drum cleaning portion 23 performs cleaning by removing residual toner and the like remaining on the outer circumferential surface of the photosensitive drum 21. In this manner, the image forming portions 20 form images (toner images), which are to be later transferred onto a sheet S.

The transfer portion 30 includes the intermediate transfer belt 31, primary transfer portions 32Y, 32C, 32M, and 32B, the secondary transfer portion 33, and a belt cleaning portion 34. The intermediate transfer belt 31 is disposed above the four image forming portions 20. The intermediate transfer belt 31 is an endless intermediate transfer member that is supported to be rotatable in a predetermined direction (counterclockwise in FIG. 1), and onto which the toner images formed respectively in the four image forming portions 20 are primarily transferred sequentially to be superimposed on one another. The four image forming portions 20 are arranged in what is called a tandem manner so as to be arrayed in line from an upstream side toward a downstream side in a rotation direction of the intermediate transfer belt 31.

The primary transfer portions 32Y, 32C, 32M, and 32B are respectively disposed above the image forming portion 20Y, 20C, 20M, and 20B corresponding to their respective colors, with the intermediate transfer belt 31 interposed therebetween. The secondary transfer portion 33 is disposed upstream of the fixing portion 6 with respect to a sheet conveyance direction of the sheet conveyance portion 4 but downstream of the four image forming portions 20Y, 20C, 20M, and 20B with respect to the rotation direction of the intermediate transfer belt 31. The belt cleaning portion 34 is disposed downstream of the secondary transfer portion 33 with respect to the rotation direction of the intermediate transfer belt 31.

The primary transfer portion 32 transfers the toner image formed on the outer circumferential surface of the photosensitive drum 21 onto the intermediate transfer belt 31. In other words, the toner images are primarily transferred onto the outer circumferential surface of the intermediate transfer belt 31 in the primary transfer portions 32Y, 32C, 32M, and 32B corresponding to the four different colors. Along with rotation of the intermediate transfer belt 31, at predetermined timings, the toner images of the four image forming portions 20 are transferred successively onto the intermediate transfer belt 31 to be superimposed on one another, and thereby, on the outer circumferential surface of the intermediate transfer belt 31, a color toner image is formed in which toner images of the four colors, namely, yellow, cyan, magenta, and black, are superimposed on one another.

The color toner image on the outer circumferential surface of the intermediate transfer belt 31 is transferred onto the sheet S, having been synchronously conveyed by the sheet conveyance portion 4, at a secondary transfer nip portion formed in the secondary transfer portion 33. The belt cleaning portion 34 performs cleaning, after the secondary transfer, by removing deposits such as residual toner and the like remaining on the outer circumferential surface of the intermediate transfer belt 31. In this manner, the transfer portion 30 transfers (records) the toner image formed on the outer circumferential surface of the photosensitive drum 21 onto the sheet S.

The fixing portion 6 is disposed above the secondary transfer portion 33. The fixing portion 6 applies heat and pressure to the sheet S having the toner image transferred thereon, and thereby fixes the toner image on the sheet S.

The sheet discharge portion 7 is disposed above the transfer portion 30. The sheet S having undergone printing with the toner image fixed thereon is conveyed to the sheet discharge portion 7. From the sheet discharge portion 7, a printed sheet (printed matter) can be taken out from above.

The control portion 8 includes a CPU, an image processor, a storage portion, and other electronic circuits and electronic components (of which none is illustrated). The CPU controls operations of various components provided in the image forming apparatus 1 based on a control program and control data stored in the storage portion, and thereby performs processing related to the functions of the image forming apparatus 1. The sheet feed portion 3, the sheet conveyance portion 4, the exposure portion 5, the image forming portion 20, the transfer portion 30, and the fixing portion 6 each individually receive a command from the control portion 8, and cooperate with each other to perform printing with respect to a sheet S. The storage portion is composed of, for example, a combination of nonvolatile storage devices such as a program ROM (read only memory), a data ROM, and the like, and a volatile storage device such as a RAM (random access memory) and the like.

Next, a description will be given of a configuration of and around the developing device 40 with reference to FIG. 3. Note that the developing devices 40 each corresponding to one of the four different colors are identical to each other in basic configuration, and thus the color identification symbols representing respective colors of the components and overlapping descriptions thereof will be omitted.

The developing device 40 supplies toner to the outer circumferential surface of the photosensitive drum 21. The developing device 40 includes a development container 41, a first stirring conveyance member 42, a second stirring conveyance member 43, a developing roller 44, a regulation member 45, and a toner concentration sensor (developing toner amount detection portion) 46.

The development container 41 has an elongated shape extending along an axis direction of the photosensitive drum 21 (a depth direction of the plane of FIG. 3) and is disposed with a longitudinal direction thereof aligned horizontally. The development container 41 contains, as a developer that includes toner to be supplied to the photosensitive drum 21, a two-component developer that includes a toner and a magnetic carrier. The development container 41 includes a partition portion 411, a first conveyance chamber 412, and a second conveyance chamber 413.

The partition portion 411 is disposed in a lower part inside the development container 41. The partition portion 411 is disposed, in a lower part of the development container 41, substantially at a central part in a direction (a right-left lateral direction in FIG. 3) intersecting with the axis direction, so as to extend in the axis direction and an up-down direction. The partition portion 411 divides an inside of the development container 41 in the direction (the right-left lateral direction in FIG. 3) intersecting with the axis direction. The development container 41 includes communication portions (not shown) that allow communication between the first conveyance chamber 412 and the second conveyance chamber 413, the communication portions being disposed one at each of opposite ends of the development container 41 in an axis direction of the partition portion 411 (the depth direction of the plane of FIG. 3).

The first conveyance chamber 412 and the second conveyance chamber 413 are provided inside the development container 41. The first conveyance chamber 412 and the second conveyance chamber 413 are formed by the partition portion 411 dividing the inside of the development container 41 and are arranged parallel to each other. The second conveyance chamber 413 is disposed inside the development container 41 so as to be below and adjacent to an area where the developing roller 44 is disposed. The first conveyance chamber 412 is disposed in an area, inside the development container 41, that is more separated from the developing roller 44 than the second conveyance chamber 413. The first conveyance chamber 412 receives replenishment of the developer via a replenishment pipe connection portion 412*a*, which is shown in FIG. 3.

The first stirring conveyance member 42 is disposed inside the first conveyance chamber 412. The second stirring conveyance member 43 is disposed inside the second conveyance chamber 413. The second stirring conveyance member 43 extends close to and parallel to the developing roller 44. The first stirring conveyance member 42 and the second stirring conveyance member 43 are each supported in the development container 41 so as to be rotatable about an axis thereof extending parallel to the photosensitive drum 21. The first stirring conveyance member 42 and the second stirring conveyance member 43 rotate about their respective rotation axes and thereby convey, while stirring, the developer along their respective rotation axes in mutually opposite directions.

Due to the rotations of the first stirring conveyance member 42 and the second stirring conveyance member 43, the developer is caused to pass through the communication portions, which are disposed at the opposite ends of the partition portion 411 in the axis direction, so as to circulate between the first conveyance chamber 412 and the second conveyance chamber 413. In the first conveyance chamber 412 and the second conveyance chamber 413, externally replenished toner is stirred and charged.

The developing roller 44, which is located above the second stirring conveyance member 43 inside the development container 41, is disposed so as to face the photosensitive drum 21. The developing roller 44 is supported in the development container 41 to be rotatable about an axis thereof extending parallel to the axis of the photosensitive drum 21.

The developing roller 44 has part of an outer circumferential surface thereof exposed out of the development container 41 so as to face, and be close to, the photosensitive drum 21. The developing roller 44 carries, on the outer circumferential surface thereof, the toner to be supplied to the outer circumferential surface of the photosensitive drum 21 in a facing area with respect to the photosensitive drum 21. The developing roller 44 causes the toner inside the second conveyance chamber 413 to adhere to an electrostatic latent image formed on the outer circumferential surface of the photosensitive drum 21, and thereby a toner image is formed.

The regulation member 45 is disposed upstream of the facing region between the developing roller 44 and the photosensitive drum 21 in a rotation direction of the developing roller 44. The regulation member 45 is disposed close to, and facing, the developing roller 44 with a predetermined space between a leading edge thereof and the outer circumferential surface of the developing roller 44. The regulation member 45 extends along an entire length of the developing roller 44 in the axis direction thereof (the depth direction of the plane of FIG. 3). The regulation member 45 regulates layer thickness of the developer (toner) carried on the outer circumferential surface of the developing roller 44 when the developer passes through the space between the leading edge of the regulation member 45 and the outer circumferential surface of the developing roller 44.

The toner concentration sensor 46 is disposed on a wall of the first conveyance chamber 412 along a longitudinal direction thereof. The toner concentration sensor 46 is disposed so as to face the first stirring conveyance member 42. In the present embodiment, a headless sensor is used as the toner concentration sensor 46. The toner concentration sensor 46, which is a headless sensor, has a sensing surface thereof embedded in an inner wall surface of the first conveyance chamber 412. The toner concentration sensor 46 detects toner concentration in the developer.

More specifically, the toner concentration sensor 46 is a sensor of a type that detects magnetic permeability, and acquires a toner concentration (a mixture ratio of the toner T to the magnetic carrier C in the developer; T/C) by detecting a change of the magnetic permeability of a two-component developer. The magnetic permeability changes with the ratio of the toner to the magnetic carrier in the developer inside the first conveyance chamber 412, and in response to such changes, the toner concentration sensor 46 outputs different signals.

In connection with later-described toner conveyance performed by using a plurality of toner replenishment paths, the control portion 8 controls starting and stopping of developer (toner and carrier) replenishment for the developing device 40, based on an output signal received from the toner concentration sensor 46. That is, the toner concentration sensor 46 is a developing toner amount detection portion that detects a toner amount by detecting a toner concentration inside the developing device 40, and is also a toner conveyance detection portion for detecting a toner conveyance error.

The toner inside the development container 41 is charged by being stirred and circulated by the first stirring conveyance member 42 and the second stirring conveyance member 43, and is caused by the second stirring conveyance member 43 to be carried on the outer circumferential surface of the developing roller 44. The developer carried on the outer circumferential surface of the developing roller 44 has a layer thickness thereof regulated by the regulation member 45, and is then conveyed, by the rotation of the developing roller 44, to the facing area between the developing roller 44 and the photosensitive drum 21. When a predetermined developing voltage is applied to the developing roller 44, due to a potential difference between the developing roller 44 and the surface (outer circumferential surface) of the photosensitive drum 21, the toner in the developer carried on the outer circumferential surface of the developing roller 44 moves, in the facing region, onto the outer circumferential surface of the photosensitive drum 21. In this manner, the electrostatic latent image on the outer circumferential surface of the photosensitive drum 21 is developed with the toner.

Figure 4:
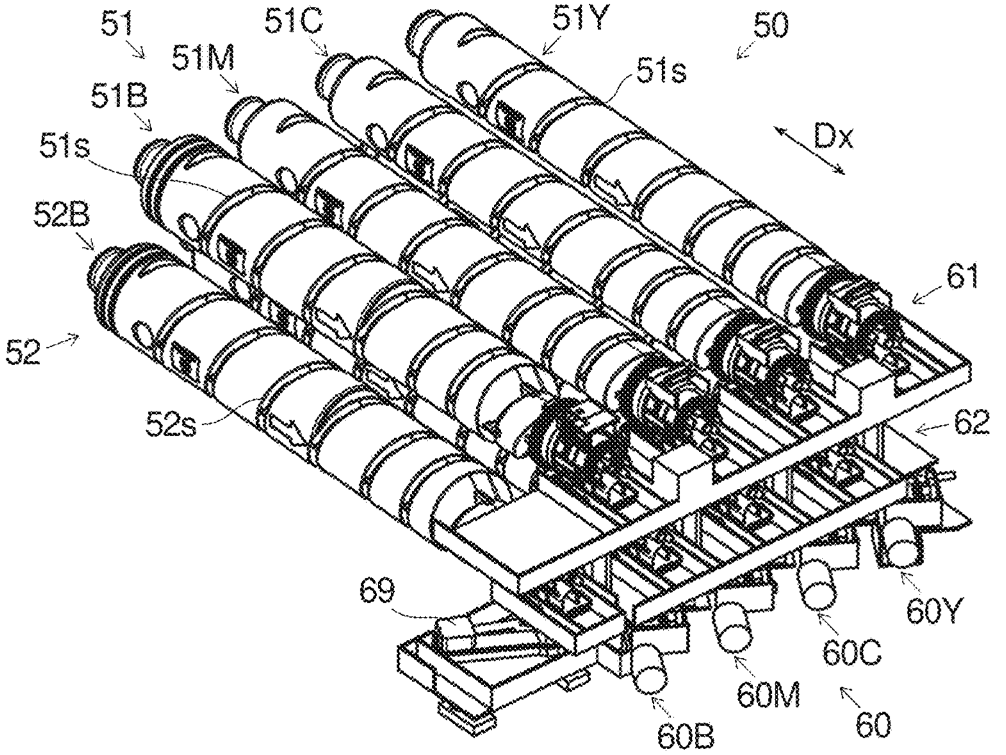
FIG. 4 is a perspective view of and around a toner replenishment device of the image forming apparatus shown in FIG. 1.

In connection with the replenishment of the toner for the developing device 40, the image forming apparatus 1 includes a container 50 and a toner replenishment device 60 (see FIG. 4). The container 50 includes a first container 51 and a second container 52. The image forming apparatus 1 includes a plurality of the containers 50 (the first container 51, the second container 52) containing toner of the same color. Note that, in the following descriptions, the first container 51 and the second container 52 may sometimes be collectively referred to as "the container 50."

The first container 51, the second container 52, and the toner replenishment device 60 are disposed above the developing device 40. The first container 51, the second container 52, and the toner replenishment device 60 are each provided one for each of the four colors of yellow, cyan, magenta, and black.

Figure 5:
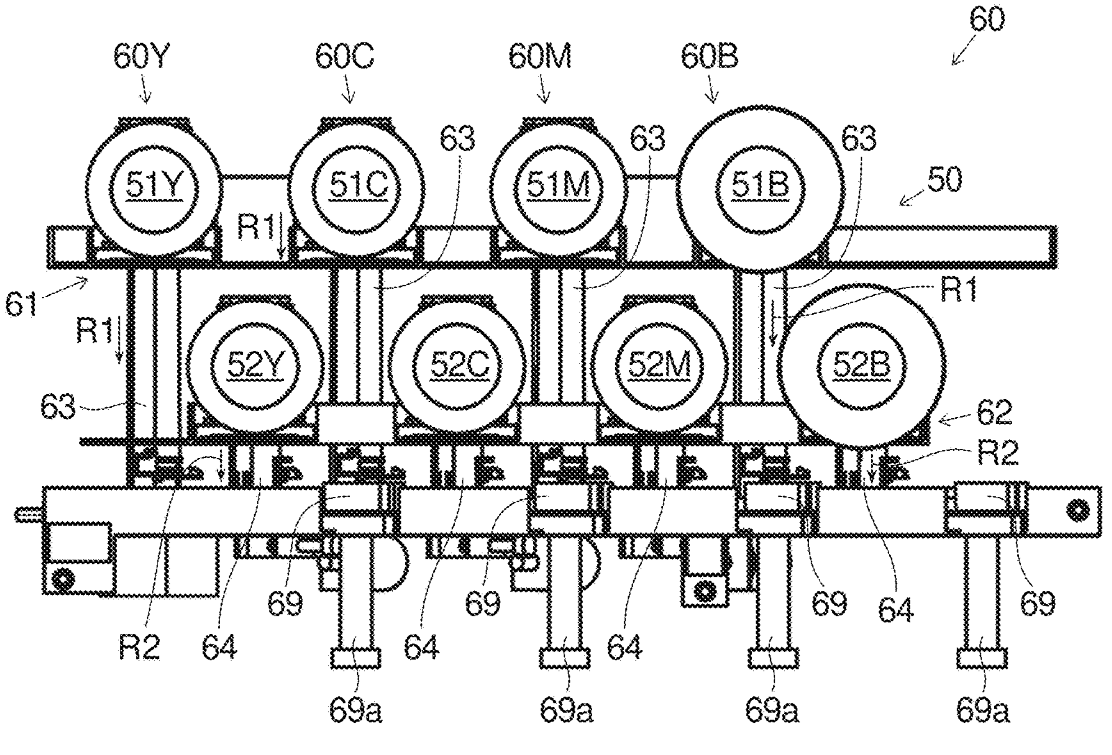
FIG. 5 is a front view of and around the toner replenishment device shown in FIG. 4.
Figure 6:
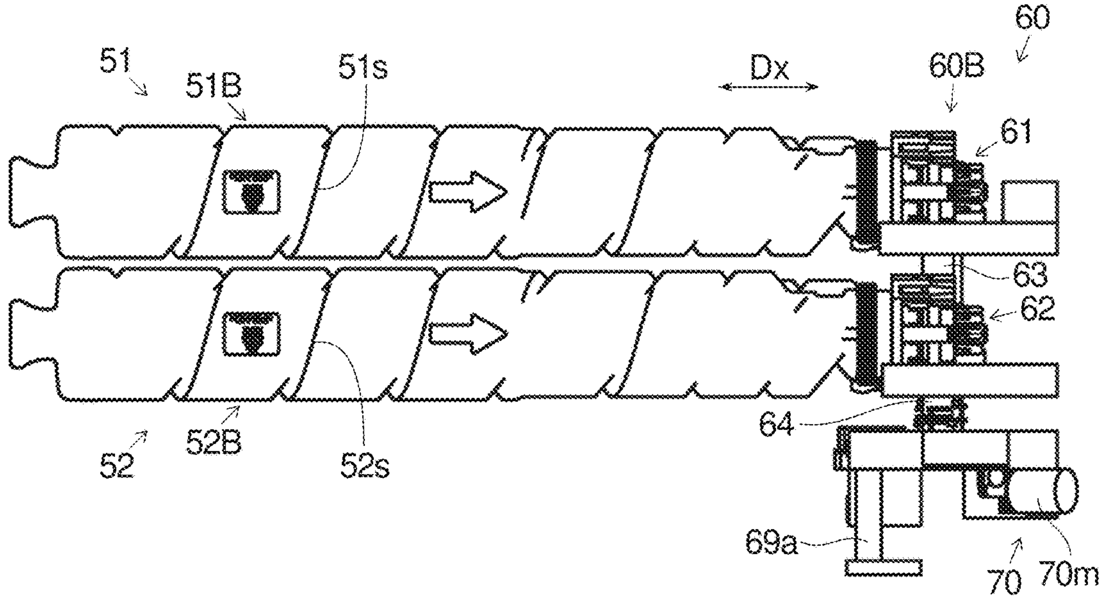
FIG. 6 is a side view of and around the toner replenishment device shown in FIG. 4.
Figure 7:
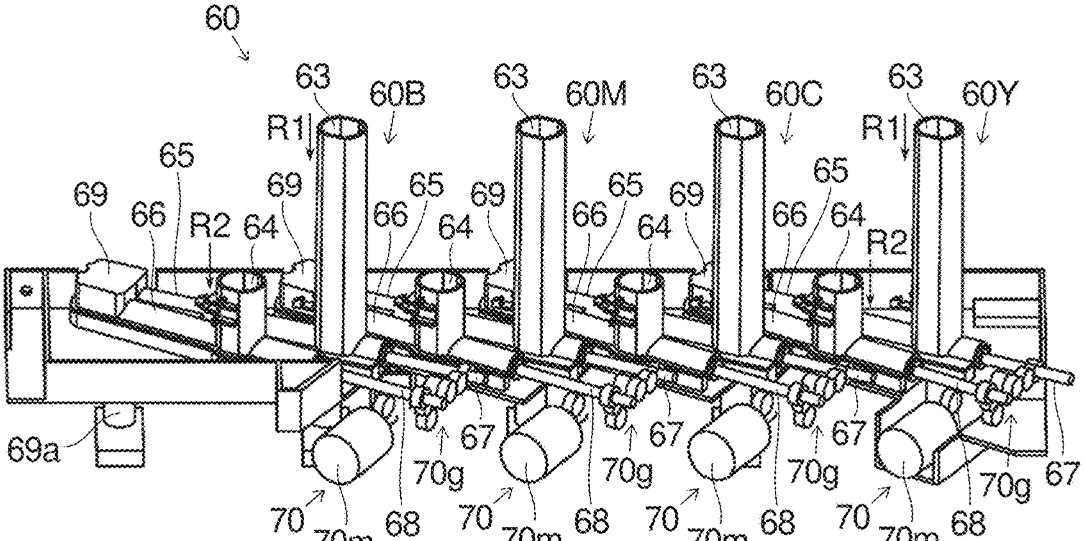
FIG. 7 is a perspective view of the toner replenishment device shown in FIG. 4.
Figure 8:
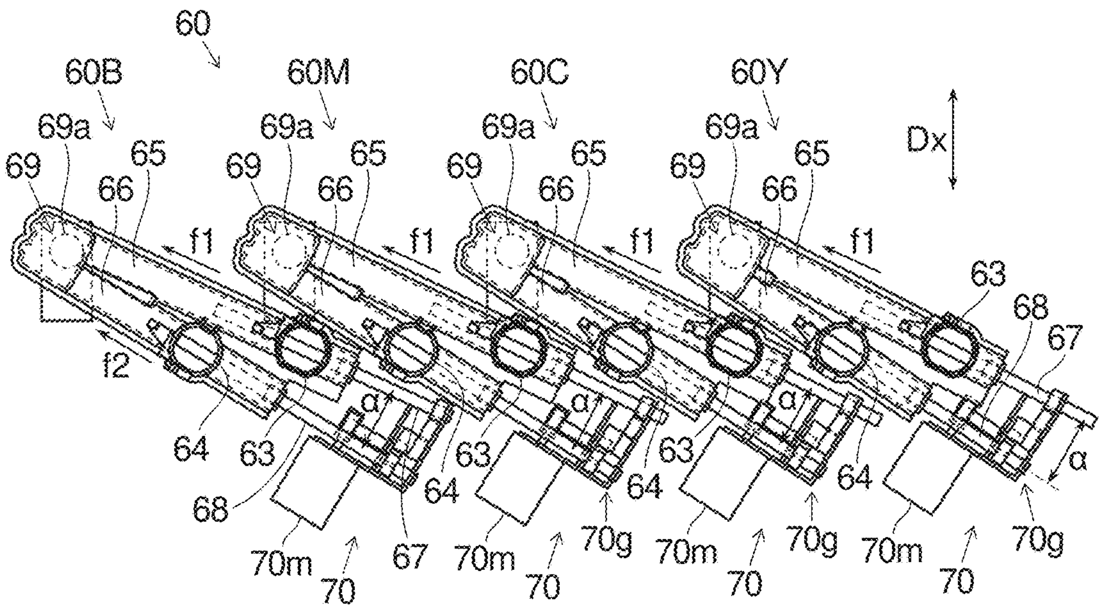
FIG. 8 is a plan view of the toner replenishment device shown in FIG. 4.
Figure 9:
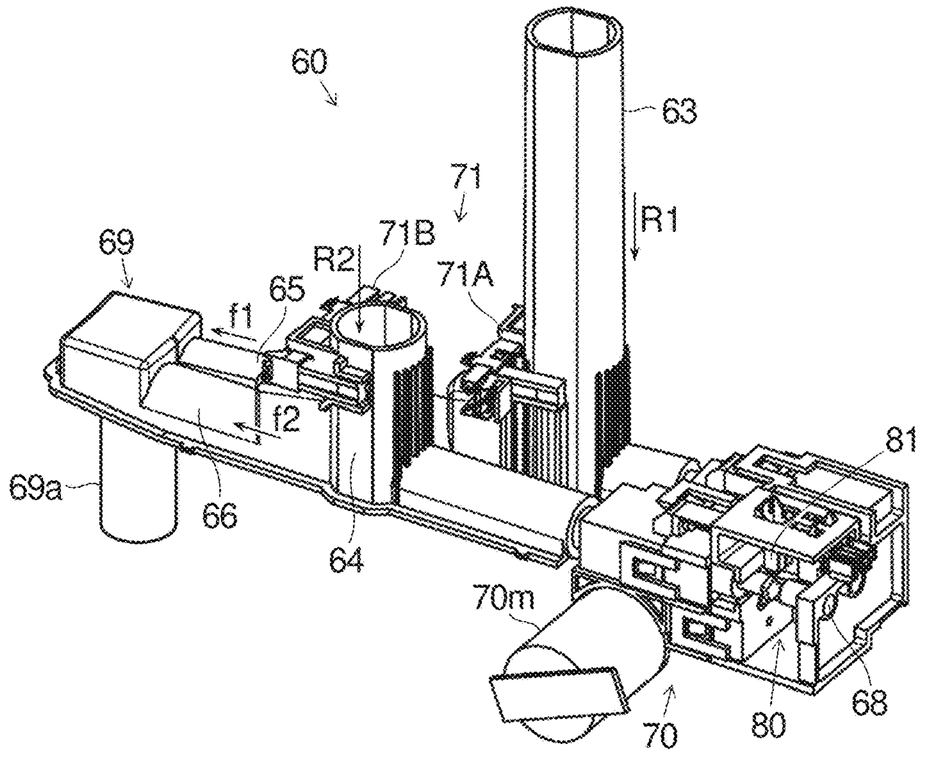
FIG. 9 is a perspective view of a first conveyance pipe and a second conveyance pipe of the toner replenishment device shown in FIG. 7.

Next, configurations of the container 50 and the toner replenishment device 60 will be described with reference to FIG. 4 to FIG. 9. FIG. 4 is a perspective view of and around the toner replenishment device 60 of the image forming apparatus 1 shown in FIG. 1. FIG. 5 and FIG. 6 are respectively a front view and a side view of the toner replenishment device 60 shown in FIG. 4. FIG. 7 and FIG. 8 are respectively a perspective view and a plan view of the toner replenishment device 60 shown in FIG. 4. FIG. 9 is a perspective view of a first conveyance pipe 65 and a second conveyance pipe 66 of the toner replenishment device 60 shown in FIG. 7.

The first container 51, the second container 52, and the toner replenishment device 60 include the following: a first container 51Y, a second container 52Y, and a toner replenishment device 60Y for yellow; a first container 51C, a second container 52C, and a toner replenishment device 60C for cyan; a first container 51M, a second container 52M, and a toner replenishment device 60M for magenta; and a first container 51B, a second container 52B, and a toner replenishment device 60B for black. The first containers 51 for the four different colors are identical in basic configuration, and the same applies to the second containers 52 and the toner replenishment devices 60 for the four different colors. Thus, in the following description, unless specific distinction is necessary, the color identification symbols "Y," "C," "M," and "B" may be omitted.

The first containers 51 are disposed above the second containers 52. The second containers 52 are disposed below the first containers 51. The first containers 51 are disposed, as seen from the front, to be deviated from the second containers 52 in an array direction of the image forming portions 20 and the toner replenishment devices 60. The first containers 51 and the second containers 52 are attachable to and detachable from the main body 2, and contain toner to be replenished to the developing devices 40.

The first containers 51 and the second containers 52 are each formed in an elongated cylindrical shape extending along the axis direction Dx of the photosensitive drum 21, and each disposed with a longitudinal direction thereof aligned horizontally. On circumferential walls of the first and second containers 51 and 52, helical protrusion portions 51*s* and 52*s* are formed, respectively, so as to protrude inward in a radial direction and to extend in the longitudinal direction.

The first and second containers 51 and 52 are each closed at one end (front side) thereof and each have an opening (not shown) at the other end (rear side) thereof in the axis direction Dx. The first and second containers 51 and 52 are, at the rear side, which is the open side, respectively connected to a first container connecting portion 61 and a second container connecting portion 62 in the toner supply device 60. The first and second containers 51 and 52 are supported on the toner supply device 60 so as to be rotatable about their axes that extend parallel to the axial direction Dx of the photosensitive drum 21.

The first and second containers 51 and 52 are caused by a driver (not shown) in the toner replenishment device 60 to rotate about their respective axes extending parallel to the axis direction Dx of the photosensitive drum 21. As the first and second containers 51 and 52 rotate, the toner inside is conveyed by the helical protrusion portions 51*s* and 52*s*, respectively, toward the rear side, which is the open side. As a result, the toner inside the first and second containers 51 and 52 flows into the toner replenishment device 60 through the opening.

The toner replenishment device 60 is disposed at the rear side of the first and second containers 51 and 52. The four toner replenishment devices 60 are arranged in a row in the same order as the four image forming portions 20. The toner replenishment devices 60 cause the first and second containers 51 and 52 to rotate to thereby convey and replenish the toner inside the first and second containers 51 and 52 to the developing device 40.

The toner replenishment devices 60 each include the first container connection portion 61, the second container connection portion 62, a first vertical pipe 63, a second vertical pipe 64, the first conveyance pipe 65, the second conveyance pipe 66, a first conveyance member 67, a second conveyance member 68, a confluence portion 69, a conveyance driving portion 70, an intermediate toner amount detection portion 71, and a rotation detection portion 80.

Note that the toner replenishment devices 60 each include a plurality of toner replenishment paths for conveying and replenishing the toner inside the container 50 to the developing device 40. Specifically, the toner replenishment devices 60 each include a first toner replenishment path R1 through which the toner is conveyed from the first container 51 toward the developing device 40, and a second toner replenishment path R2 through which the toner is conveyed from the second container 52 toward the developing device 40. The first toner replenishment path R1 includes the first container connection portion 61, the first vertical pipe 63, the first conveyance pipe 65, and the first conveyance member 67. The second toner replenishment path R2 includes the second container connection portion 62, the second vertical pipe 64, the second conveyance pipe 66, and the second conveyance member 68.

The first container connection portion 61 is disposed in an upper part of the toner replenishment device 60 so as to be above the second container connection portion 62. The first container connection portion 61 includes a toner flow path (not shown) provided inside thereof. The first container connection portion 61 is connected to the open side of the first container 51, and rotatably supports the first container 51. A downstream end of the first container connection portion 61 in a toner flow direction is connected to the first vertical pipe 63. To replenish the developing device 40 with the toner from the first container 51, the toner flows from the first container 51 into the first container connection portion 61, then through it, and out toward the first vertical pipe 63.

The second container connection portion 62 is disposed in an upper part of the toner replenishment device 60 so as to be below the first container connection portion 61. The second container connection portion 62 includes a toner flow path (not shown) provided inside thereof. The second container connection portion 62 is connected to the open side of the second container 52, and rotatably supports the second container 52. A downstream end of the second container connection portion 62 in the toner flow direction is connected to the second vertical pipe 64. To replenish the developing device 40 with the toner from the second container 52, the toner flows from the second container 52 into the second container connection portion 62, then through it, and out toward the second vertical pipe 64.

The first vertical pipe 63 is disposed between the first container connection portion 61 and the first conveyance pipe 65. The first vertical pipe 63 is formed in a cylindrical shape extending in the up-down direction. An upper end of the first vertical pipe 63 is connected to the first container connection portion 61. A lower end of the first vertical pipe 63 is connected to the first conveyance pipe 65. To replenish the developing device 40 with the toner from the first container 51, the toner flows through the first container connection portion 61 into the first vertical pipe 63, then through it, and out toward the first conveyance pipe 65.

The second vertical pipe 64 is disposed between the second container connection portion 62 and the second conveyance pipe 66. The second vertical pipe 64 is formed in a cylindrical shape extending in the up-down direction. An upper end of the second vertical pipe 64 is connected to the second container connection portion 62. A lower end of the second vertical pipe 64 is connected to the second conveyance pipe 66. To replenish the developing device 40 with the toner from the second container 52, the toner flows through the second container connection portion 62 into the second vertical pipe 64, then through it, and out toward the second conveyance pipe 66.

Due to the first container 51 and the first container connection portion 61 being disposed above the second container 52 and the second container connection portion 62, the first vertical pipe 63 is longer than the second vertical pipe 64 in the up-down direction. Due to the second container 52 and the second container connection portion 62 being disposed below the first container 51 and the first container connection portion 61, the second vertical pipe 64 is shorter than the first vertical pipe 63 in the up-down direction. The first vertical pipe 63 and the second vertical pipe 64 are disposed at the same position in the axis direction Dx of the photosensitive drum 21. In other words, the first vertical pipe 63 and the second vertical pipe 64 are arranged side by side on a straight line that is orthogonal to the axis direction Dx.

The first conveyance pipe 65 is arranged between the first vertical pipe 63 and the confluence portion 69 in the up-down direction. The first conveyance pipe 65 is formed in a horizontally extending cylindrical shape. To one end of the first conveyance pipe 65 in its extending direction, the first vertical pipe 63 is connected. The other end of the first conveyance pipe 65 in its extending direction is connected to the confluence portion 69. To replenish the developing device 40 with the toner from the first container 51, the toner flows through the first vertical pipe 63 into the first conveyance pipe 65, then through it, and out toward the confluence portion 69. In other words, the first conveyance pipe 65 is connected between the first container 51 and the confluence portion 69, and the toner is conveyed from the first container 51 side toward the confluence portion 69 side.

The second conveyance pipe 66 is disposed between the second vertical pipe 64 and the confluence portion 69 in the up-down direction. The second conveyance pipe 66 is formed in a horizontally extending cylindrical shape. To one end of the second conveyance pipe 66 in its extending direction, the second vertical pipe 64 is connected. The other end of the second conveyance pipe 66 in its extending direction is connected to the confluence portion 69. To replenish the developing device 40 with the toner from the second container 52, the toner flows through the second vertical pipe 64 into the second conveyance pipe 66, then through it, and out toward the confluence portion 69. In other words, the second conveyance pipe 66 is connected between the second container 52 and the confluence portion 69, and the toner is conveyed from the second container 52 side toward the confluence portion 69 side.

The first conveyance pipe 65 and the second conveyance pipe 66 are arranged side by side in a direction (horizontal direction) intersecting with their respective extending directions so as to join together at the confluence portion 69, to which a replenishment pipe 69*a* is connected. In other words, the first conveyance pipe 65 and the second conveyance pipe 66 are disposed such that their respective extension lines intersect with each other at their sides close to the confluence portion 69 in their extending directions. The first conveyance pipe 65 and the second conveyance pipe 66 are disposed such that an angle between their extending directions is an acute angle in the horizontal direction, that is, they are arranged in a V-shape as seen from the up-down direction.

The first conveyance member 67 is disposed inside the first conveyance pipe 65. The first conveyance member 67 includes a rotation shaft that is provided between opposite ends of the cylindrical first conveyance pipe 65 in the axis direction, and a first conveyance blade that is formed on an outer circumferential surface of the rotation shaft so as to extend in a helical shape along the axis direction. The first conveyance member 67 is supported inside the first conveyance pipe 65 so as to be rotatable about an axis extending in the horizontal direction. Note that one end part of the first conveyance member 67 in the axis direction is located inside the confluence portion 69.

The first conveyance member 67 rotates about its axis, thereby stirring and conveying the toner in the first conveyance pipe 65 along a toner conveyance direction f1 (see FIG. 8 and FIG. 9) that is parallel to the rotation axis. The first conveyance member 67 conveys the toner in the first conveyance pipe 65 from the first vertical pipe 63 side toward the confluence portion 69 side. In other words, the first conveyance member 67 conveys the toner from the first container 51 side toward the confluence portion 69 side.

The second conveyance member 68 is disposed inside the second conveyance pipe 66. The second conveyance member 68 includes a rotation shaft that is provided between opposite ends of the cylindrical second conveyance pipe 66 in the axis direction, and a second conveyance blade that is formed on an outer circumferential surface of the rotation shaft so as to extend in a helical shape along the axis direction. The second conveyance member 68 is supported inside the second conveyance pipe 66 so as to be rotatable about an axis extending in the horizontal direction. Note that one end part of the second conveyance member 68 in the axis direction is located inside the confluence portion 69.

The second conveyance member 68 rotates about the axis, thereby stirring and conveying the toner in the second conveyance pipe 66 along a toner conveyance direction f2 (see FIG. 8 and FIG. 9) that is parallel to the rotation axis. The second conveyance member 68 conveys the toner in the second conveyance pipe 66 from the second vertical pipe 64 side toward the confluence portion 69 side. In other words, the second conveyance member 68 conveys the toner from the second container 52 side toward the confluence portion 69 side.

As mentioned previously, the first conveyance pipe 65 and the second conveyance pipe 66 are arranged in a V-shape as seen from the up-down direction. That is, the rotation shaft of the first conveyance member 67 and the rotation shaft of the second conveyance member 68 are arranged with a predetermined shaft angle $\alpha$ formed between them.

The confluence portion 69 is disposed at downstream ends of the first conveyance pipe 65 and the second conveyance pipe 66 in their respective toner conveyance directions. The confluence portion 69 allows the toner in the first conveyance pipe 65 and in the second conveyance pipe 66 to join together at the downstream ends in their respective toner conveyance directions. The confluence portion 69 also allows the joined toner to flow into the developing device 40. The confluence portion 69 includes the replenishment pipe 69*a*.

The replenishment pipe 69*a*, which is a lower part of the confluence portion 69, is disposed in a lower part of the toner replenishment device 60. The toner replenishment devices 60 each include the single replenishment pipe 69*a*. The replenishment pipe 69*a* is formed in a cylindrical shape extending in the up-down direction. An upper end of the replenishment pipe 69*a* is connected to a part at which the first conveyance pipe 65 and the second conveyance pipe 66 join together. A lower end of the replenishment pipe 69*a* is connected to the replenishment pipe connection portion 412*a* of the developing device 40. To replenish the developing device 40 with the toner from the first container 51 and the second container 52, the toner flows into the replenishment pipe 69*a* in the confluence portion 69, and then flows through the replenishment pipe 69*a* into the developing device 40.

That is, the confluence portion 69 is disposed at downstream ends of the first toner replenishment path R1 and the second toner replenishment path R2 in their respective toner conveyance directions so as to allow the toner to join together to flow into the developing device 40.

The conveyance driving portion 70 is disposed, in a rear part of the toner replenishment device 60, so as to be upstream of the first conveyance pipe 65 and the second conveyance pipe 66 in their toner conveyance directions. The conveyance driving portion 70 includes a motor 70*m* and a gear group 70*g* composed of a plurality of gears. The motor 70*m* is coupled via the gear group 70*g* to each of the first conveyance member 67 and the second conveyance member 68. The conveyance driving portion 70 causes the motor 70*m* to rotate either forward or backward, and thereby selectively causes one of the first conveyance member 67 and the second conveyance member 68 to rotate.

The intermediate toner amount detection portion 71 includes a first intermediate toner amount detection portion 71A and a second intermediate toner amount detection portion 71B. The first intermediate toner amount detection portion 71A is disposed at a lower part of the first vertical pipe 63. The second intermediate toner amount detection portion 71B is disposed at a lower part of the second vertical pipe 64. The first intermediate toner amount detection portion 71A and the second intermediate toner amount detection portion 71B are, similarly to the toner concentration sensor 46, each constituted of a sensor of a type that detects magnetic permeability. The first intermediate toner amount detection portion 71A, at the lower part of the first vertical pipe 63, detects a change in magnetic permeability of the two-component developer, and outputs a detection signal. The second intermediate toner amount detection portion 71B, at the lower part of the second vertical pipe 64, detects a change in magnetic permeability of the two-component developer, and outputs a detection signal.

In connection with toner conveyance performed by using the plurality of toner replenishment paths, the control portion 8 controls starting and stopping of developer replenishment for the developing device 40, based on the output signals received from the first intermediate toner amount detection portion 71A and the second intermediate toner amount detection portion 71B. That is, the first intermediate toner amount detection portion 71A is a toner amount detection portion that detects a toner amount on the first toner replenishment path R1. The second intermediate toner amount detection portion 71B is a toner detection portion that detects a toner amount on the second toner replenishment path R2. Further, the first intermediate toner amount detection portion 71A and the second intermediate toner amount detection portion 71B are toner conveyance detection portions for detecting toner conveyance errors.

The rotation detection portion 80 is disposed, in a rear part of the toner replenishment device 60, so as to be upstream of the conveyance driving portion 70 in the toner conveyance direction. The rotation detection portion 80 includes a container toner amount detection portion 81 and light-shielding plates (not shown) that individually rotate respectively with the first conveyance member 67 and the second conveyance member 68.

The container toner amount detection portion 81 is a light transmissive sensor, for example, including a light emitter and a light receiver, and has an optical path extending from the light emitter toward the light receiver. The light-shielding plates move into, and withdraw from, the optical path of the light transmissive sensor. The container toner amount detection portion 81 detects rotation of each of the first conveyance member 67 and the second conveyance member 68, and outputs a detection signal.

In connection with toner conveyance performed by using the plurality of toner replenishment paths, the control portion 8 detects a toner amount in each of the first container 51 and the second container 52 based on the output signal received from the container toner amount detection portion 81. Specifically, the control portion 8 counts the number of rotations of the first and second conveyance members 67 and 68 based on the output signal form the container toner amount detection portion 81, and detects, based on the counted number of rotations, a toner amount in the first and second containers 51 and 52. That is, the container toner amount detection portion 81 is a toner conveyance detection portion that detects a toner amount in the container 50 to thereby detect a conveyance error in the toner conveyance performed by using the plurality of toner replenishment paths.

Further, in a case where the toner conveyance detection portion (the toner concentration sensor 46, the intermediate toner amount detection portion 71, and the container toner amount detection portion 81) has detected a toner conveyance error in one of the toner replenishment paths that is in use, the control portion 8 switches to another one of the toner replenishment paths to convey the toner. That is, in a case where a toner conveyance error has been detected in one of the first toner replenishment path R1 and the second toner replenishment path R2 that is in use, the control portion 8 switches to the other toner replenishment path to convey the toner.

According to the above-described configuration, which detects a conveyance error in toner conveyance performed by using the plurality of toner replenishment paths, no matter in which one of the toner replenishment paths a conveyance error occurs, it is possible to continue toner conveyance and replenishment by switching to another replenishment path. Thus, it is possible, in the image forming apparatus 1, to suppress interruptions in toner replenishment for the developing device 40 and to continue appropriate image formation.

Further, as described previously, the toner conveyance detection portion is a toner amount detection portion that includes the toner concentration sensor 46, the intermediate toner amount detection portion 71, and the container toner amount detection portion 81. The control portion 8 detects, based on results of detection performed by these three toner amount detection portions, a toner conveyance error in one of the toner replenishment paths that is in use. In this manner, it is possible to detect toner conveyance errors in accordance with respective characteristics of the developing device 40, the toner replenishment device 60, and the container 50. That is, it becomes possible to appropriately detect a toner conveyance error in the first toner replenishment path R1 and in the second toner replenishment path R2. Thus, it is possible, in the image forming apparatus 1, to suppress interruptions in toner replenishment for the developing device 40, and thus to continue appropriate image formation.

Further, the toner replenishment device 60 includes the first toner replenishment path R1, the second toner replenishment path R2, and the confluence portion 69, and also includes the first intermediate toner amount detection portion 71A and the second intermediate toner amount detection portion 71B. This enables the image forming apparatus 1 to perform toner conveyance by using two toner replenishment paths. And, even when a conveyance error occurs in one of the two toner replenishment paths in the image forming apparatus 1, it is possible to switch to the other replenishment path to continue the conveyance and replenishment of the toner.

Figure 10:
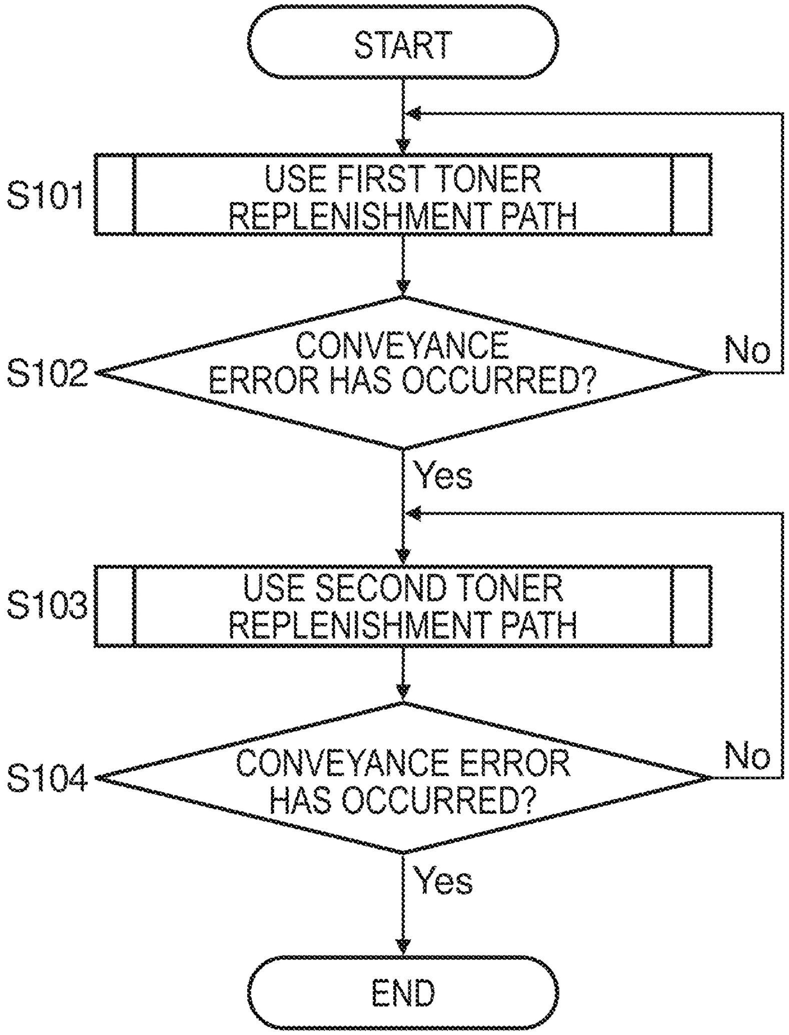
FIG. 10 is a flowchart schematically showing an example of processing in toner conveyance error detection performed with respect to a plurality of toner replenishment paths.

Next, a description will be given of an outline of a flow in toner conveyance error detection processing with respect to the plurality of toner replenishment paths. FIG. 10 is a flowchart schematically showing an example of processing in toner conveyance error detection performed with respect to the plurality of toner replenishment paths. In the present embodiment, the image forming apparatus 1 includes two toner replenishment paths, namely, the first toner replenishment path R1 and the second toner replenishment path R2.

When the image forming apparatus 1 is started to operate ("START" in FIG. 10), the control portion 8 starts toner conveyance and replenishment for the developing device 40 by using the first toner replenishment path R1 (step S101). Note that, in a case where the first container 51 has already become empty by then, for example, the control portion 8 may sometimes start toner conveyance and replenishment for the developing device 40 by using the second toner replenishment path R2.

Next, the control portion 8 determines, by means of the toner conveyance detection portion (the toner concentration sensor 46, the first intermediate toner amount detection portion 71A, and the container toner amount detection portion 81), whether or not a conveyance error has been detected in the toner conveyance performed by using the first toner replenishment path R1 (step S102). If no toner conveyance error has been detected (No in step S102), the flow returns to step S101, where the toner conveyance and replenishment for the developing device 40 is continued by using the first toner replenishment path R1.

In a case where the toner conveyance detection portion has detected a toner conveyance error in the first toner replenishment path R1 in use (Yes in step S102), the control portion 8 switches to the second toner replenishment path R2 to convey the toner (step S103).

Next, the control portion 8 determines, by means of the toner conveyance detection portion, whether or not a conveyance error has been detected in the toner conveyance performed by using the second toner replenishment path R2 (step S104). In a case where no toner conveyance error has been detected (No in step S104), the flow returns to step S103, where the toner conveyance and replenishment for the developing device 40 is continued by using the second toner replenishment path R2.

In a case where the toner conveyance detection portion has detected a toner conveyance error in the second toner replenishment path R2 in use (Yes in step S104), the control portion 8 ends the processing shown in FIG. 10.

Note that, in a case where the image forming apparatus 1 includes more toner replenishment paths such as third, fourth, fifth . . . , and nth toner replenishment paths, the control portion 8 sequentially switches to another toner replenishment path every time a toner conveyance error is detected in one of the toner replenishment paths that is in use. Further, in the present embodiment, when a toner conveyance error is detected in the second toner replenishment path R2 in use, if a conveyance error in the toner conveyance performed by using the first toner replenishment path R1 has been cleared, the control portion 8 switches to the first toner replenishment path R1 to convey the toner.

Figure 11:
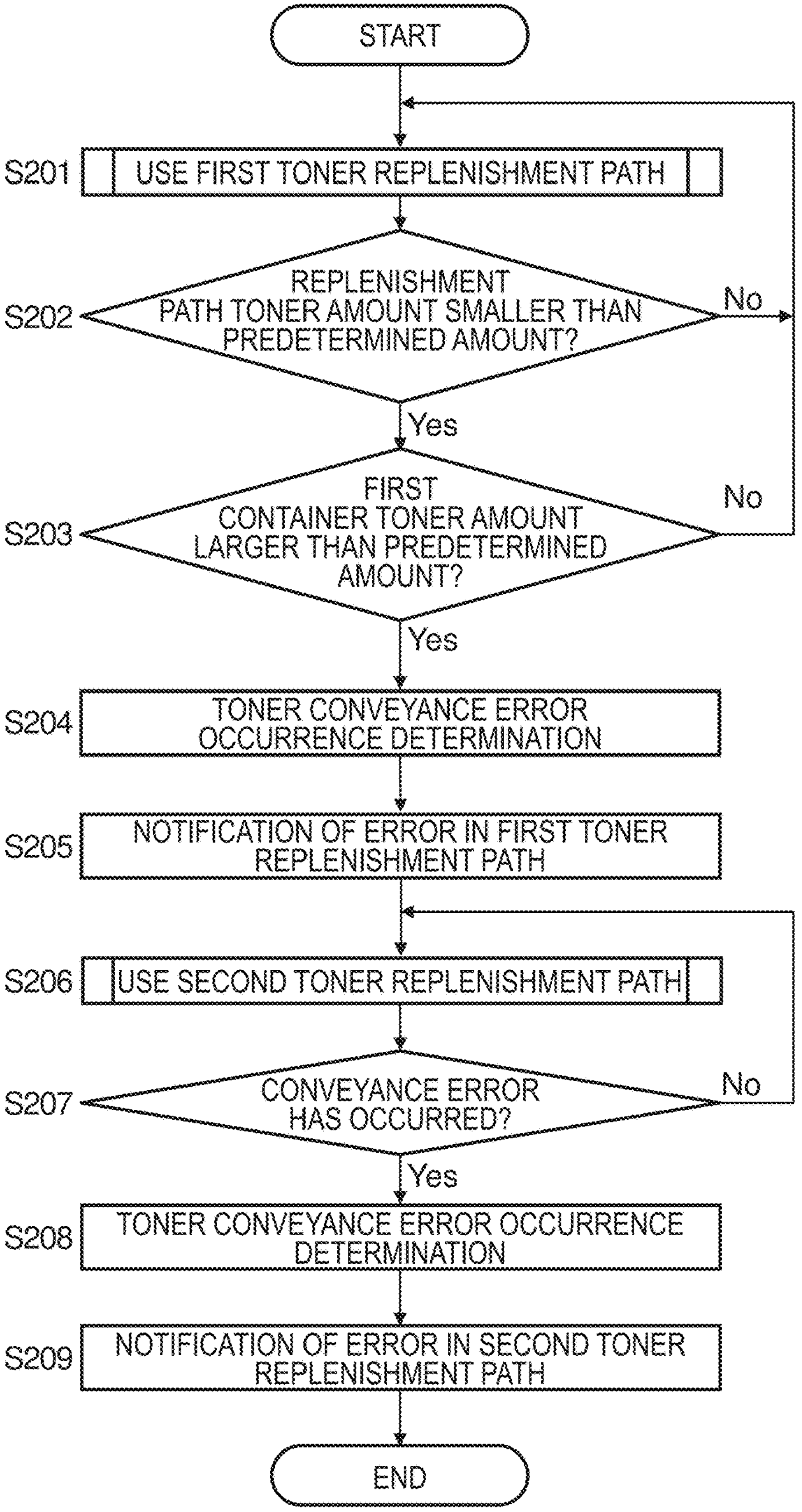
FIG. 11 is a flowchart showing a first example of the processing in the toner conveyance error detection performed with respect to the plurality of toner replenishment paths.

Next, a description will be given of a first processing example which is a detailed flow in the toner conveyance error detection processing performed with respect to the plurality of toner replenishment paths. FIG. 11 is a flowchart showing the first example of the processing in the toner conveyance error detection performed with respect to the plurality of toner replenishment paths. Similarly to the case shown in FIG. 10, in the present embodiment, the image forming apparatus 1 includes two toner replenishment paths, namely, the first toner replenishment path R1 and the second toner replenishment path R2.

When the image forming apparatus 1 is started to operate ("START" in FIG. 11), the control portion 8 starts toner conveyance and replenishment for the developing device 40 by using the first toner replenishment path R1 (step S201).

Next, the control portion 8 determines, by means of the first intermediate toner amount detection portion 71A, whether or not the toner amount on the first toner replenishment path R1 is smaller than a predetermined value (step S202). In a case where the toner amount on the first toner replenishment path R1 is larger than the predetermined value (No in step S202), that is, in a case where no toner conveyance error has been detected, the flow returns to step S201, where the toner conveyance and replenishment for the developing device 40 is continued by using the first toner replenishment path R1.

In a case where the toner amount on the first toner replenishment path R1 is smaller than the predetermined value (Yes in step S202), the control portion 8 determines, by means of the container toner amount detection portion 81, whether or not the toner amount in the first container 51 is larger than a predetermined value (step S203). In a case where the toner amount in the first container 51 is smaller than the predetermined value (No in step S203), that is, in a case where no toner conveyance error has been detected, the flow returns to step S201, where the toner conveyance and replenishment for the developing device 40 is continued by using the first toner replenishment path R1.

Note that processing of detecting a state where the toner amount in the first container 51 is nearly zero and a state where the toner amount is exactly zero and processing related to dealing with those are performed according to another processing flow, which is different from the flow of processing performed to detect and deal with a toner conveyance error in the present embodiment.

In a case where the toner amount in the first container 51 is larger than the predetermined value (Yes in step S203), that is, in a case where a toner conveyance error has been detected, the control portion 8 determines that a toner conveyance error has occurred in the first toner replenishment path R1 in use (step S204). Then, the control portion 8 causes the display portion 2*d* of the main body 2 to display cautions and messages such as “TONER CONVEYANCE ERROR DETECTED IN FIRST TONER REPLENISHMENT PATH,” “MAINTENANCE REQUESTED,” and the like (step S205).

Next, the control portion 8 switches to the second toner replenishment path R2 to convey the toner (step S206). Thereafter, in steps from step S206 through step S208, the control portion 8 performs, with respect to the second toner replenishment path R2, processing that is similar to the processing performed in steps from step S201 through step S204.

Then, after determining the conveyance error in the toner conveyance performed by using the second toner replenishment path R2 (step S208), the control portion 8 causes the display portion 2*d* of the main body 2 to display cautions and messages such as “TONER CONVEYANCE ERROR DETECTED IN SECOND TONER REPLENISHMENT PATH/APPARATUS STOPPED,” “MAINTENANCE REQUESTED,” and the like (step S209). Then, the control portion 8 ends the processing shown in FIG. 11.

Figure 12:
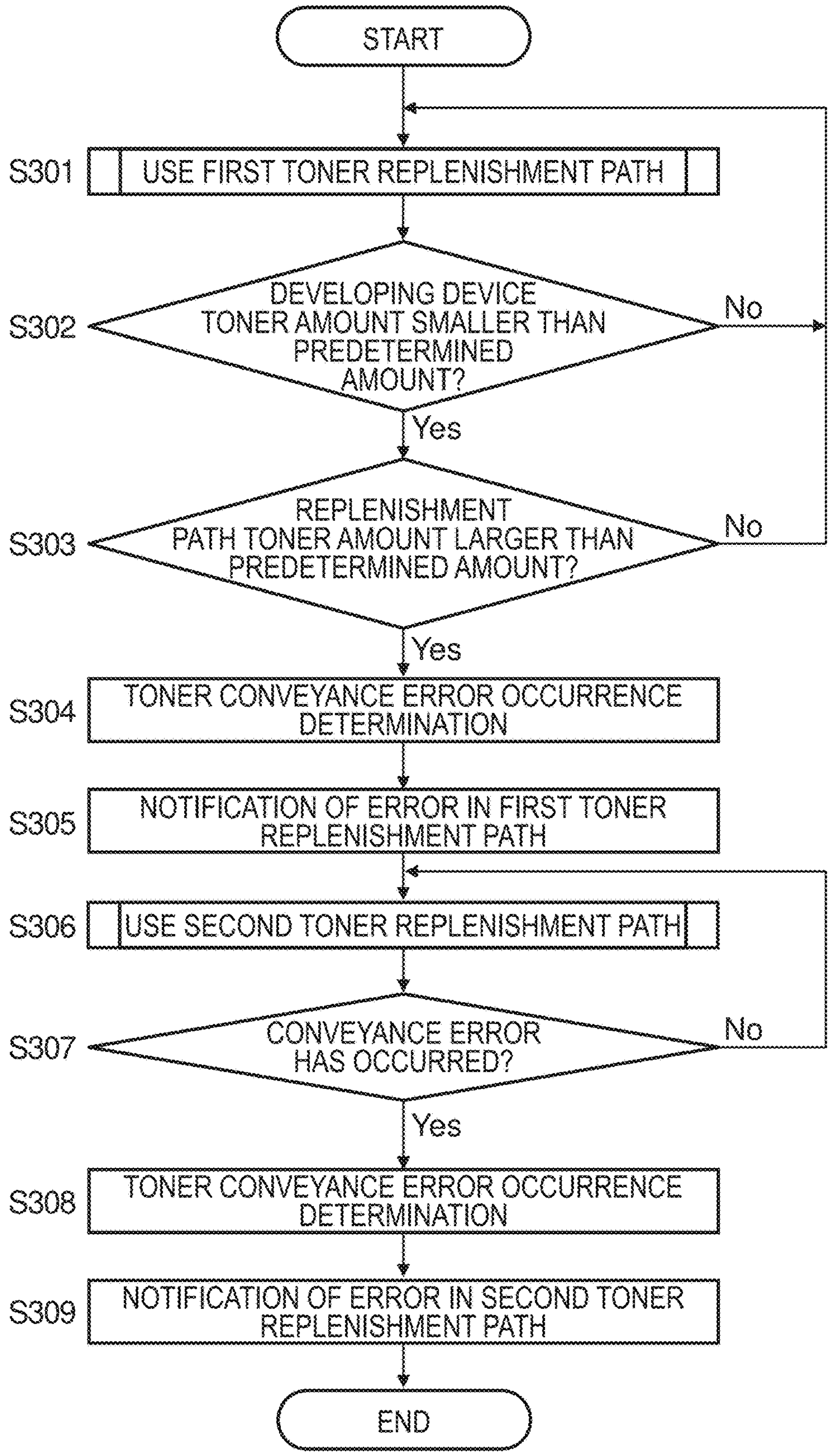
FIG. 12 is a flowchart showing a second example of the processing in the toner conveyance error detection performed with respect to the plurality of toner replenishment paths.

Next, a description will be given of a second processing example which is a detailed flow in the toner conveyance error detection processing performed with respect to the plurality of toner replenishment paths. FIG. 12 is a flowchart showing the second example of the processing in the toner conveyance error detection performed with respect to the plurality of toner replenishment paths. Similarly to the case shown in FIG. 10, in the present embodiment, the image forming apparatus 1 includes two toner replenishment paths, namely, the first toner replenishment path R1 and the second toner replenishment path R2.

When the image forming apparatus 1 is started to operate (“START” in FIG. 12), the control portion 8 starts toner conveyance and replenishment for the developing device 40 by using the first toner replenishment path R1 (step S301).

Next, the control portion 8 determines, by means of the toner concentration sensor 46, whether or not a toner amount in the developing device 40 is smaller than a predetermined value (step S302). In a case where the toner amount in the developing device 40 is larger than the predetermined value (No in step S302), that is, in a case where no toner conveyance error has been detected, the flow returns to step S301, where the toner conveyance and replenishment for the developing device 40 is continued by using the first toner replenishment path R1.

In a case where the toner amount in the developing device 40 is smaller than the predetermined value (Yes in step S302), the control portion 8 determines, by means of the first intermediate toner amount detection portion 71A, whether or not the toner amount on the first toner replenishment path R1 is larger than a predetermined value (step S303). In a case where the toner amount on the first toner replenishment path R1 is smaller than the predetermined value (No in step S303), that is, in a case where no toner conveyance error has been detected, the flow returns to step S301, where the toner conveyance and replenishment for the developing device 40 is continued by using the first toner replenishment path R1.

In a case where the toner amount on the first toner replenishment path R1 is larger than the predetermined value (Yes in step S303), that is, in a case where a toner conveyance error has been detected, the control portion 8 determines that a toner conveyance error has occurred in the first toner replenishment path R1 in use (step S304). Then, the control portion 8 causes the display portion 2*d* of the main body 2 to display cautions and messages such as “TONER CONVEYANCE ERROR DETECTED IN FIRST TONER REPLENISHMENT PATH,” “MAINTENANCE REQUESTED,” and the like (step S305).

Next, the control portion 8 switches to the second toner replenishment path R2 to convey the toner (step S306). Thereafter, in steps from step S306 through step S308, the control portion 8 performs, with respect to the second toner replenishment path R2, processing that is similar to the processing performed in steps from step S301 through step S304.

Then, after determining the conveyance error in the toner conveyance performed by using the second toner replenishment path R2 (step S308), the control portion 8 causes the display portion 2*d* of the main body 2 to display cautions and messages such as “TONER CONVEYANCE ERROR DETECTED IN SECOND TONER REPLENISHMENT PATH/APPARATUS STOPPED,” “MAINTENANCE REQUESTED,” and the like (step S309). Then, the control portion 8 ends the processing shown in FIG. 12.

According to the above-described configuration, it becomes possible to appropriately detect, and make a determination as to, a toner conveyance error in the first toner replenishment path R1 and the second toner replenishment path R2. Thus, it is possible, in the image forming apparatus 1, to suppress interruptions in toner replenishment for the developing device 40 and to continue appropriate image formation. Furthermore, it is also possible, as to the toner conveyance path where a toner conveyance error has been determined, to notify the user of the toner conveyance error. This makes it possible, in the image forming apparatus 1, to quickly urge the user to deal with the toner conveyance error.

The above-described embodiment is by no means meant to limit the scope of the present disclosure, and various modifications can be made and implemented within the scope not departing from the gist of the present disclosure.

For example, although, in the embodiment described above, it is assumed that the image forming apparatus 1 is what is called a tandem type color image forming apparatus in which images in a plurality of colors are formed so as to be sequentially superimposed on one another, the present disclosure is not limited to image forming apparatuses of such a type. The image forming apparatus may also be a non-tandem type color image forming apparatus for color printing or a monochrome image forming apparatus.

What is claimed is:

1. An image forming apparatus, comprising:

a developing device that supplies toner to an image carrier;

a container that contains the toner to be replenished to the developing device;

a toner replenishment device that includes a plurality of toner replenishment paths through which the toner in the container is conveyed and replenished to the developing device;

a toner conveyance detection portion that detects a toner conveyance error in toner conveyance performed by using the plurality of toner replenishment paths; and a control portion that controls operations of the developing device and the toner replenishment device, wherein in a case where the toner conveyance detection portion has detected the toner conveyance error in one of the toner replenishment paths that is in use, the control portion switches to another one of the toner replenishment paths to convey the toner, the toner conveyance detection portion includes a toner amount detection portion that detects a toner amount in the developing device, in the container, and in the plurality of toner conveyance paths, the toner amount detection portion includes an intermediate toner amount detection portion that detects the toner amount on the toner replenishment paths, and a container toner amount detection portion that detects the toner amount in the container, and in a case where the control portion has detected that the toner amount is smaller than a predetermined value by means of the intermediate toner amount detection portion and has also detected that the toner amount is larger than a predetermined value by means of the container toner amount detection portion, the control portion determines that the toner conveyance error has occurred in one of the toner replenishment paths that is in use.

2. The image forming apparatus according to claim 1, wherein the container includes a first container and a second container, the toner in the first container and the toner in the second container being of a same color, and the toner replenishment device includes a first toner replenishment path through which the toner is conveyed from the first container toward the developing device, a second toner replenishment path through which the toner is conveyed from the second container toward the developing device, a confluence portion that is disposed at downstream ends of the first toner replenishment path and the second toner replenishment path in respective toner conveyance directions thereof so as to allow the toner to join together to flow into the developing device, a first intermediate toner amount detection portion that detects the toner amount on the first toner replenishment path, and a second intermediate toner amount detection portion that detects the toner amount on the second toner replenishment path.

3. An image forming apparatus, comprising:

a developing device that supplies toner to an image carrier;

a container that contains the toner to be replenished to the developing device;

a toner replenishment device that includes a plurality of toner replenishment paths through which the toner in the container is conveyed and replenished to the developing device;

a toner conveyance detection portion that detects a toner conveyance error in toner conveyance performed by using the plurality of toner replenishment paths; and a control portion that controls operations of the developing device and the toner replenishment device, wherein in a case where the toner conveyance detection portion has detected the toner conveyance error in one of the toner replenishment paths that is in use, the control portion switches to another one of the toner replenishment paths to convey the toner, the toner conveyance detection portion includes a toner amount detection portion that detects a toner amount in the developing device, in the container, and in the plurality of toner conveyance paths, the toner amount detection portion includes a developing toner amount detection portion that detects the toner amount by detecting a toner concentration in the developing device, and an intermediate toner amount detection portion that detects the toner amount on the toner replenishment paths, and in a case where the control portion has detected that the toner amount is smaller than a predetermined value by means of the developing toner amount detection portion and has also detected that the toner amount is larger than a predetermined value by means of the intermediate toner amount detection portion, the control portion determines that the toner conveyance error has occurred in one of the toner replenishment paths that is in use.

4. The image forming apparatus according to claim 3 wherein the container includes a first container and a second container, the toner in the first container and the toner in the second container being of a same color, and the toner replenishment device includes a first toner replenishment path through which the toner is conveyed from the first container toward the developing device, a second toner replenishment path through which the toner is conveyed from the second container toward the developing device, a confluence portion that is disposed at downstream ends of the first toner replenishment path and the second toner replenishment path in respective toner conveyance directions thereof so as to allow the toner to join together to flow into the developing device, a first intermediate toner amount detection portion that detects the toner amount on the first toner replenishment path, and a second intermediate toner amount detection portion that detects the toner amount on the second toner replenishment path.

5. An image forming apparatus, comprising:

a developing device that supplies toner to an image carrier;

a container that contains the toner to be replenished to the developing device;

a toner replenishment device that includes a plurality of toner replenishment paths through which the toner in the container is conveyed and replenished to the developing device;

a toner conveyance detection portion that detects a toner conveyance error in toner conveyance performed by using the plurality of toner replenishment paths; and a control portion that controls operations of the developing device and the toner replenishment device, wherein in a case where the toner conveyance detection portion has detected the toner conveyance error in one of the toner replenishment paths that is in use, the control portion switches to another one of the toner replenishment paths to convey the toner, the toner conveyance detection portion includes a first toner amount detection portion and a second toner amount detection portion that detect toner amounts, corresponding to mutually different positions, with respect to the toner conveyed from the container to the developing device, the second toner amount detection portion detects the toner amount corresponding to a position upstream of the first toner amount detection portion in a toner conveying direction of one of the toner supply paths that is in use, and in a case where the control portion has detected that the toner amount is smaller than a predetermined value by means of the first toner amount detection portion and has also detected that the toner amount is larger than a predetermined value by means of the second toner amount detection portion, the control portion determines that the toner conveyance error has occurred in one of the toner replenishment paths that is in use.

* * * * *